United States Patent
Fischer et al.

(10) Patent No.: US 8,198,992 B2
(45) Date of Patent: Jun. 12, 2012

(54) SEAT BELT WARNING SYSTEM

(75) Inventors: Thomas Fischer, Wenden (DE);
Christian A. Fischer, Remscheid (DE);
Marcel Fruend, Remscheid (DE); Kai Niederhagen, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 432 days.

(21) Appl. No.: 12/468,336

(22) Filed: May 19, 2009

(65) Prior Publication Data
US 2009/0295557 A1 Dec. 3, 2009

(30) Foreign Application Priority Data
May 29, 2008 (EP) .................... 08009821

(51) Int. Cl.
*G08B 21/00* (2006.01)
*B60Q 1/00* (2006.01)

(52) U.S. Cl. .......... 340/438; 340/667; 280/735; 73/718; 73/724; 73/862.046; 180/273

(58) Field of Classification Search .......... 177/210 C, 177/210 R, 144; 73/862.046, 862.626, 862.636, 73/718; 340/457.1, 665, 666, 667, 573.1, 340/563; 361/283.1; 324/686–688; 280/735
See application file for complete search history.

(56) References Cited

U.S. PATENT DOCUMENTS

| | | | | |
|---|---|---|---|---|
| 3,678,378 A * | 7/1972 | Trott et al. | | 177/210 C |
| 3,875,481 A * | 4/1975 | Miller et al. | | 361/283.1 |
| 4,128,857 A * | 12/1978 | Rayburn | | 361/309 |
| 4,644,801 A * | 2/1987 | Kustanovich | | 73/862.046 |
| 4,827,763 A * | 5/1989 | Bourland et al. | | 73/172 |
| 5,412,327 A * | 5/1995 | Meinen | | 324/686 |
| 5,693,886 A * | 12/1997 | Seimiya et al. | | 73/718 |
| 6,778,090 B2 * | 8/2004 | Newham | | 340/573.1 |
| 7,132,642 B2 * | 11/2006 | Shank et al. | | 250/221 |
| 7,217,891 B2 * | 5/2007 | Fischer et al. | | 177/144 |
| 7,391,310 B2 * | 6/2008 | Ito et al. | | 340/457.1 |
| 7,395,717 B2 * | 7/2008 | DeAngelis et al. | | 73/728 |
| 2003/0122669 A1 * | 7/2003 | Filippov et al. | | 340/563 |
| 2006/0267321 A1 * | 11/2006 | Harish et al. | | 280/735 |
| 2007/0115121 A1 * | 5/2007 | Schleeh | | 340/562 |
| 2008/0239685 A1 * | 10/2008 | Kawabe et al. | | 361/782 |

FOREIGN PATENT DOCUMENTS
WO 9822836 5/1998
WO 2007098216 8/2007
* cited by examiner Primary Examiner — George Bugg
Assistant Examiner — Anne Lai
(74) Attorney, Agent, or Firm — Lawrence D. Hazelton

(57) ABSTRACT

A safety belt warning system for vehicles comprises a sensor mat for the detection of a force acting on its surface, which includes, for the formation of two electrical capacitors, two dielectric layers which are located one above the other in sandwich fashion and arranged in each case between electrically conductive coats, and which have different compressibility at least in the direction of loading due to force, so that the capacitances of the two capacitors vary differently with a load on the sensor mat.

15 Claims, 6 Drawing Sheets $C_1 <= C_2$ $C_1 >> C_2$

SEAT BELT WARNING SYSTEM

TECHNICAL FIELD

The invention concerns a safety belt warning system for vehicles, having a sensor mat for the detection of a force acting on its surface.

BACKGROUND OF THE INVENTION

Vehicles are increasingly being fitted with safety belt warning systems which, for a respective vehicle seat loaded by the weight of a person, generate a warning signal in the event that the safety belt is not done up. A conventional safety belt warning system includes for example a graphite composite-based sensor on a PET (e.g. polyethylene terephthalate) film with a contact dye of which the resistance varies as a function of the pressure applied. Because such a sensor is arranged under the seat cover, a number of problems arise. Thus the sensor affects the comfort when sitting. The design of the seat cover can have an effect on the performance of the sensor and so is subject to corresponding restrictions.

Also, the foam is subject to certain restrictions with respect to the surface design. Lastly, the behaviour of the sensor which depends on the humidity and/or ageing is critical as well.

SUMMARY OF THE INVENTION

It is the object of the invention to provide an improved safety belt warning system of the kind mentioned hereinbefore, in which the above problems are eliminated. In this case with a simple construction in particular easy evaluation of the sensor signals is to be made possible, and a reliable manner of operation substantially independent of ambient influences is to be ensured.

This object is achieved according to the invention by the fact that the sensor mat includes, for the formation of two electrical capacitors, two dielectric layers which are located one above the other in sandwich fashion and arranged in each case between electrically conductive coats, and which have different compressibility at least in the direction of loading due to force, so that the capacitances of the two capacitors vary differently with a respective load on the sensor mat.

The sensor mat of such a safety belt warning system can in particular be arranged underneath the foam of a respective vehicle seat, so that the safety belt warning system has no effect on comfort while sitting. Accordingly, there are no restrictions with respect to surface design of the seat either. As the capacitances of two capacitors subject to the same environmental conditions can be used for evaluation of the variations caused by a respective load, the system is stable in relation to environmental influences. Also, with use of the capacitances of the two capacitors for evaluation, the respective evaluating device can be kept relatively simple.

Preferably, one of the two dielectric layers is compressible and the other dielectric layer is at least substantially incompressible. In this case it is particularly advantageous if, with a respective load on the sensor mat, one of the two dielectric layers is clearly compressed and so on the respective capacitance varies clearly, while the other dielectric layer is at least substantially not compressed, so that its capacitance remains at least substantially unchanged.

According to a preferred practical embodiment of the safety belt warning system according to the invention, the capacitances of the two capacitors are at least substantially equal when there is no load on the sensor mat.

Advantageously, the safety belt warning system includes an evaluating device for generating if occasion arises a belt warning signal as a function of the capacitances of the two capacitors. In this case the evaluating device is preferably designed in such a way that the belt warning signal can be generated as a function of a variation in the capacitances of the two capacitors relative to each other.

A preferred practical embodiment of the safety belt warning system according to the invention is distinguished in that the evaluating device includes a bridge circuit, the two capacitors being associated with different branches of this bridge circuit. It is of particular advantage here if the bridge circuit is balanced when there is no load on the sensor mat. Such balancing can be brought about for example by the fact that the capacitances of the two capacitors are at least substantially equal when there is no load on the sensor mat.

Appropriately, the dielectric layer of the sensor mat which has the relatively higher compressibility is arranged above the dielectric layer which has the relatively lower compressibility.

With an appropriate practical embodiment, the sensor mat comprises a flexible film folded twice to form two intermediate spaces, the two dielectric layers being inserted in the two intermediate spaces formed by the flexible film.

In particular a PET or PEN film can be provided as the flexible film. The electrically conductive coats associated with the two capacitors are advantageously formed by an electrically conductive coating, in particular copper coating, of the flexible film.

It is also particularly advantageous if at least one of the two dielectric layers of the sensor mat is air-permeable. Preferably, each of the two dielectric layers is air-permeable. The two dielectric layers are therefore comparably exposed to the ambient conditions.

Preferably, the dielectric layer of the sensor mat which has the relatively higher compressibility is at least partially made of silicone rubber.

At least the dielectric layer which has the relatively lower compressibility can for example have a three-dimensional knitted spacer fabric.

According to a preferred practical embodiment of the safety belt warning system according to the invention, the two dielectric layers of the sensor mat have an at least substantially equal temperature expansion coefficient and/or an at least substantially equal moisture expansion coefficient.

The respective ambient conditions therefore have at least substantially the same effect on the two dielectric layers so that, particularly when using the variations in capacitances of the two capacitors relative to each other in evaluation, respective ambient influences are at least substantially compensated.

With the safety belt warning system according to the invention, therefore, a sensor which was previously arranged directly under the seat cover ("a surface sensor") can be replaced by a capacitive sensor mat which is arranged under the foam of the respective seat and of which the capacitance values are evaluated by means of a balanced bridge circuit. The sensor mat as such can for example comprise a doubly folded flexible film or base mat with a silicone rubber inlay as the flexible dielectric upper layer, and a non-elastic dielectric layer having a three-dimensional knitted spacer fabric as the lower layer. With such a construction two capacitor elements are formed which have at least substantially the same capacitance when the seat is empty, that is, not loaded. If on the other hand the seat concerned is loaded, the upper capacitor varies its capacitance considerably, this being due to the correspondingly high compression of the silicone rubber inlay. On the other hand, the lower layer remains at least substantially unchanged, so that correspondingly the capacitance of the lower capacitor remains at least substantially unchanged. For evaluation of the sensor signals and for generation of the belt warning signal, a simple bridge circuit is sufficient, for example. By a suitable design, effects caused by the ambient conditions such as in particular humidity can be compensated, as the two capacitors vary in the same way due to moisture and ageing effects.

The safety belt warning system according to the invention consequently affords in particular the following advantages.

The comfort while sitting is not impaired, as the safety belt warning system or the sensor mat can be arranged underneath the foam of the seat concerned. Also, the system does not in any way affect the surface design. Furthermore, optimum stability in relation to ambient conditions is achieved. For evaluation, ordinary electronic circuits are sufficient, thus reducing the costs accordingly.

Seat occupation is therefore possible in an extremely cheap and reliable manner. Such seat occupation can be detected for example when the weight concerned is greater than 30 kg. An empty seat can for example be detected when the weight concerned is less than 6 kg.

The double capacitor of sandwich construction is obtained for example by using a PET or PEN film with copper coating. The two dielectric intermediate layers have different stiffness or elasticity or compressibility. When there is no load on a respective seat, the two capacitors can have at least substantially the same capacitance. On the other hand, when the seat is loaded one dielectric layer is compressed, while the other dielectric layer remains in particular at least substantially unchanged.

Such behaviour can be detected in an extremely simple manner for example by an ordinary bridge circuit. With respect to moisture and temperature effects there is self-compensation. Lastly, the safety belt warning system according to the invention is extremely robust and insensitive to mechanical loads.

BRIEF DESCRIPTION OF THE DRAWINGS

Further characteristics and advantages of the invention are apparent from the drawings; these show.

DESCRIPTION OF THE PREFERRED EMBODIMENT

Figure 1:
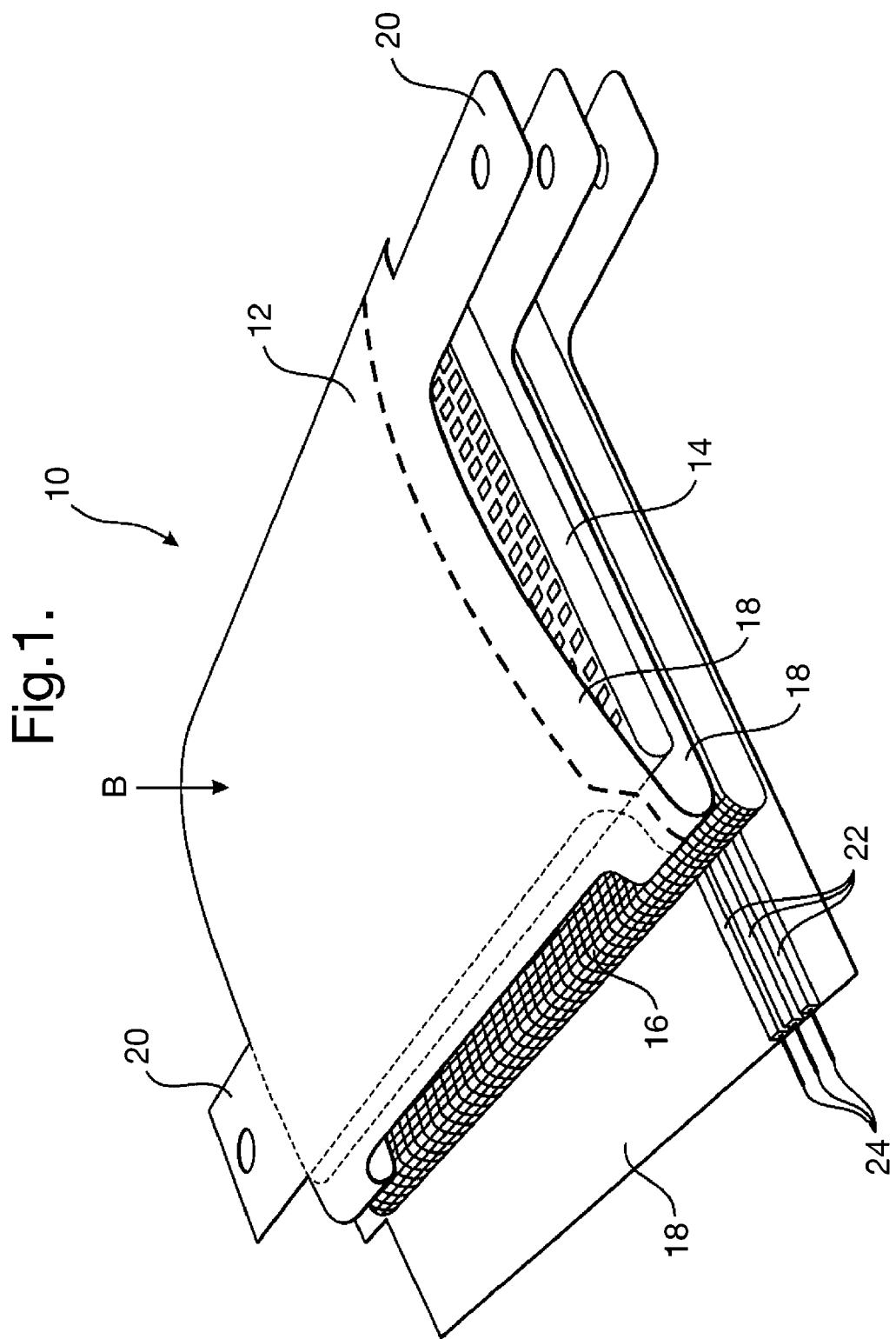
FIG. 1 is a schematic perspective view of an embodiment of the sensor mat of a safety belt warning system by way of example.

FIG. 1 shows in a schematic perspective view an embodiment of a sensor mat 10 by way of example used for the detection of a force acting on its surface, of a safety belt warning system designed in particular for vehicles.

Figure 3:
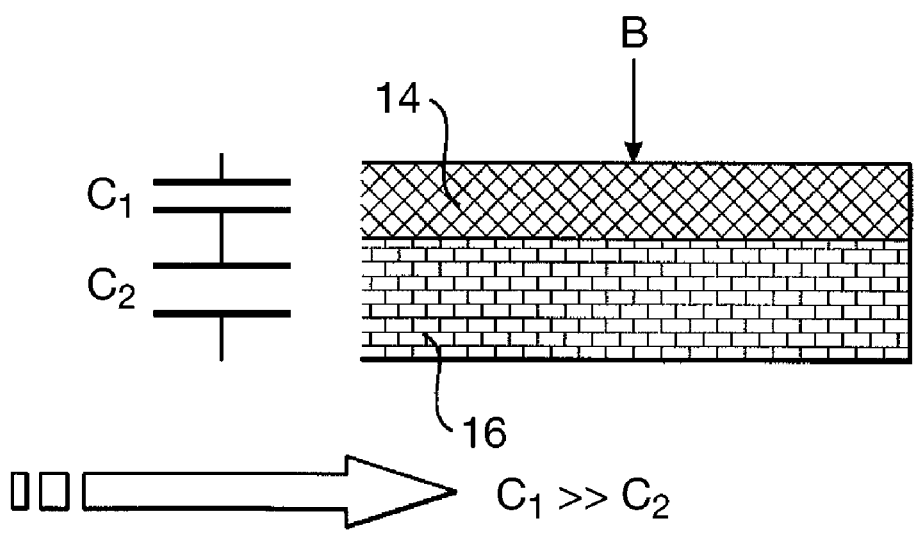
FIG. 3 is a schematic view of the two dielectric layers of the sensor mat as in FIG. 1 when there is a load.
Figure 4:
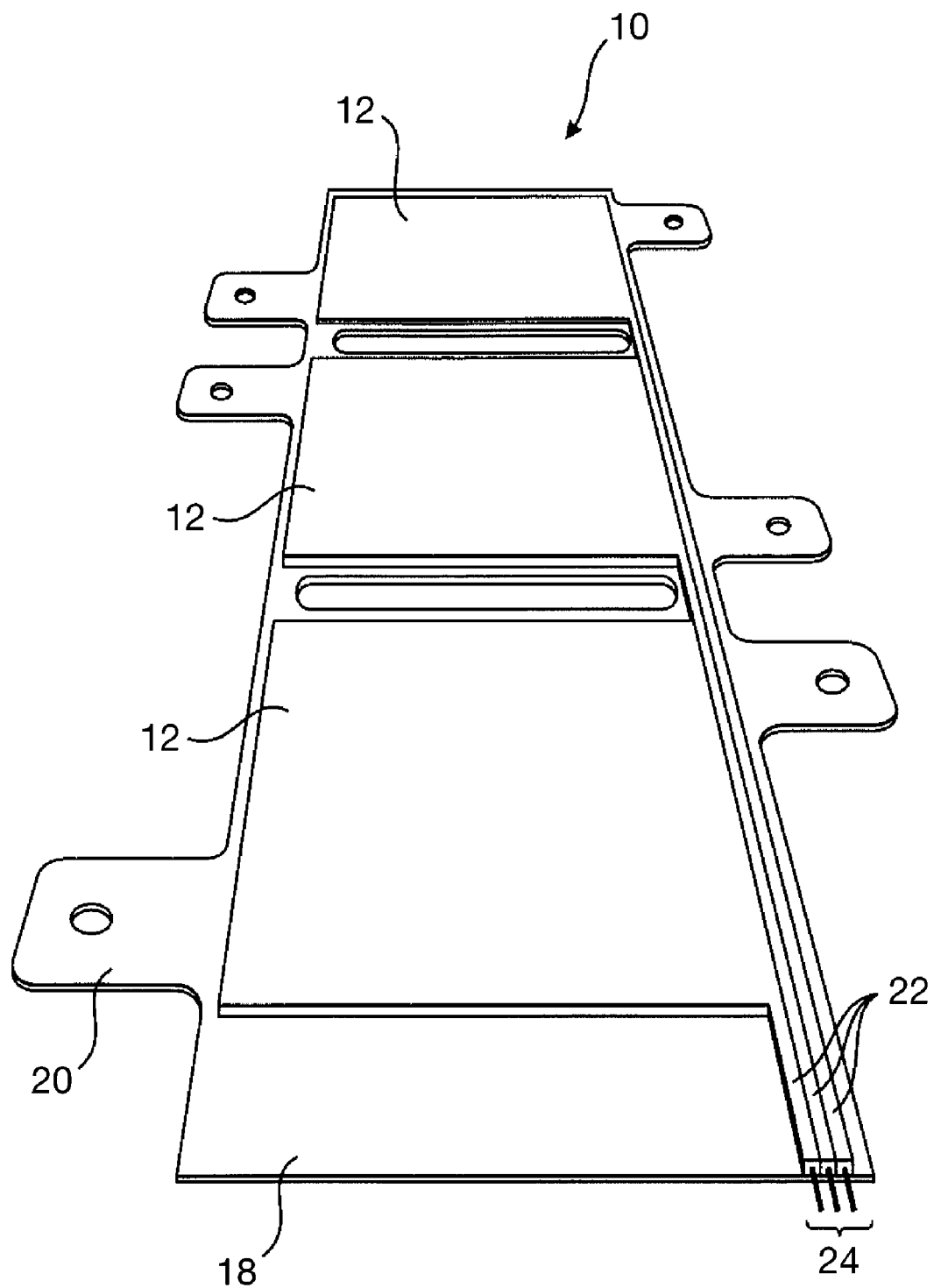
FIG. 4 is a schematic view of the sensor mat as in FIG. 1 in the unfolded state.

As can be seen with the aid of FIG. 1, the sensor mat 10 comprises, for the formation of two electrical capacitors $C_1$, $C_2$ (cf. for example FIGS. 2, 3 and 6), two dielectric layers 14, 16 located one above the other in sandwich fashion and arranged in each case between electrically conductive coats 12 (cf. FIG. 4). In this case the two dielectric layers 14, 16 have different compressibility at least in the direction of loading caused by the force, so that the capacitances of the two capacitors $C_1$, $C_2$ vary differently with a respective load on the sensor mat 10. The direction of loading is marked with a respective arrow "B" in FIGS. 1 to 3.

The more compressible dielectric layer 14 can be arranged for example above the less compressible or incompressible dielectric layer 16. The two dielectric layers 14, 16 can in particular be such that dielectric layer 14 is highly compressible under the loads in question, and the other dielectric layer is substantially incompressible under the loads in question.

The sensor mat 10 can in particular be designed in such a way that the capacitances of the two capacitors $C_1$, $C_2$ are at least substantially equal when there is no load.

The sensor mat 10 can comprise a flexible film 18 folded twice to form two intermediate spaces, the two dielectric layers 14, 16 being inserted in the two intermediate spaces formed by the flexible film 18, as can be seen with the aid of FIG. 1. In particular a PET or PEN film can be provided as the flexible film 18.

The electrically conductive coats 12 associated with the two capacitors $C_1$, $C_2$ can for example be formed by an electrically conductive coating, in particular copper coating, of the flexible film 18 (cf. in particular FIG. 4).

At least one of the two dielectric layers 14, 16 of the sensor mat 10 can be air-permeable, preferably each of the two dielectric layers 14, 16 being air-permeable.

The dielectric layer 14 of the sensor mat 10 which has the relatively higher compressibility can be at least partially made of silicone rubber.

Figure 5:
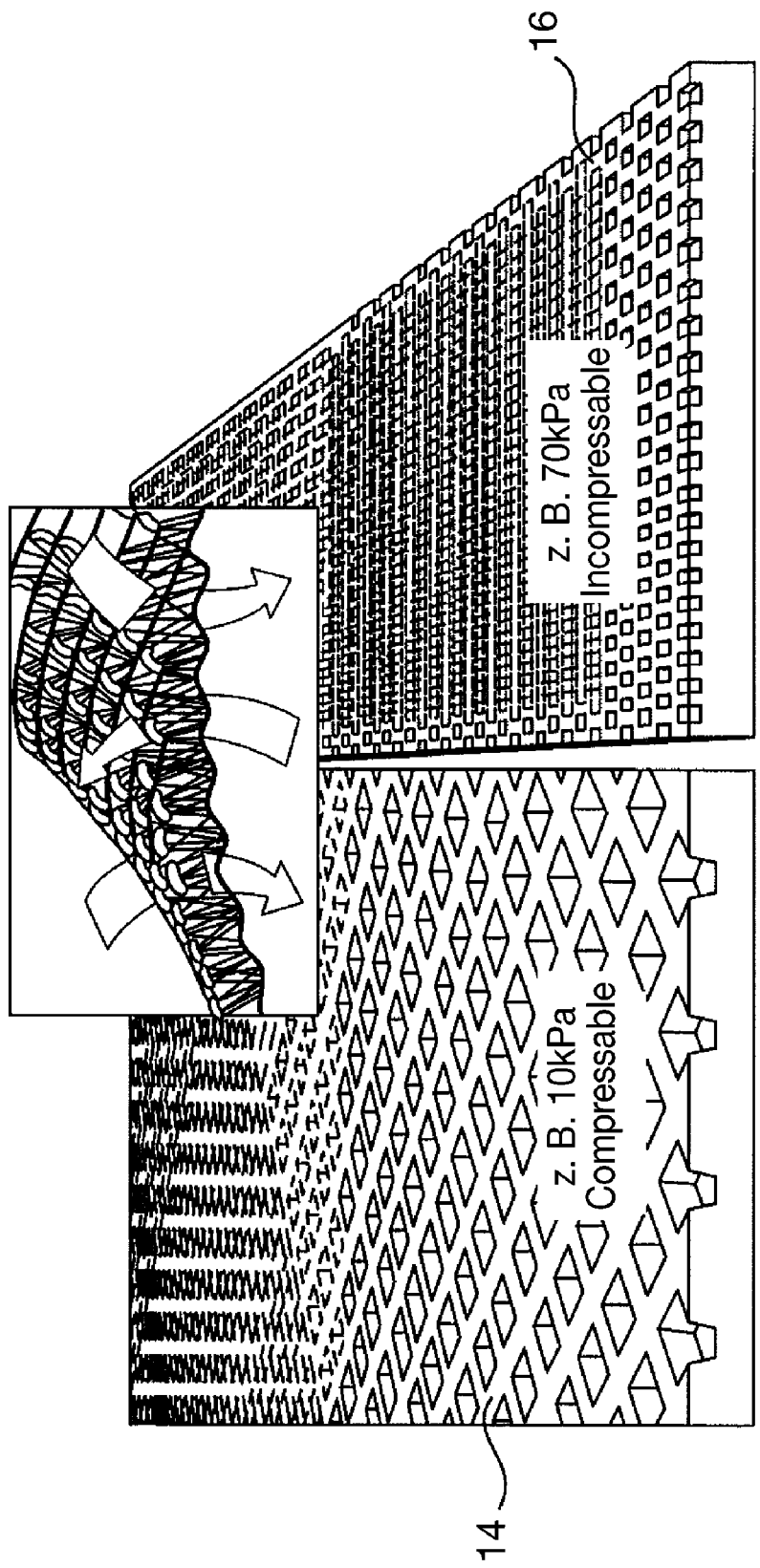
FIG. 5 is a comparison of materials for the two dielectric layers of the sensor mat by way of examples.

At least the dielectric layer 16 which has the relatively lower compressibility or is incompressible can in particular have a three-dimensional knitted spacer fabric (cf. in particular FIG. 5).

Also, the two dielectric layers 14, 16 of the sensor mat 10 can have an at least substantially equal temperature expansion coefficient and/or an at least substantially equal moisture expansion coefficient.

As can be seen with the aid of FIG. 1, the flexible film 18 can be provided with tabs 20 by which the sensor mat 10 can be fixed in particular underneath the foam of the seat concerned.

Figure 6:
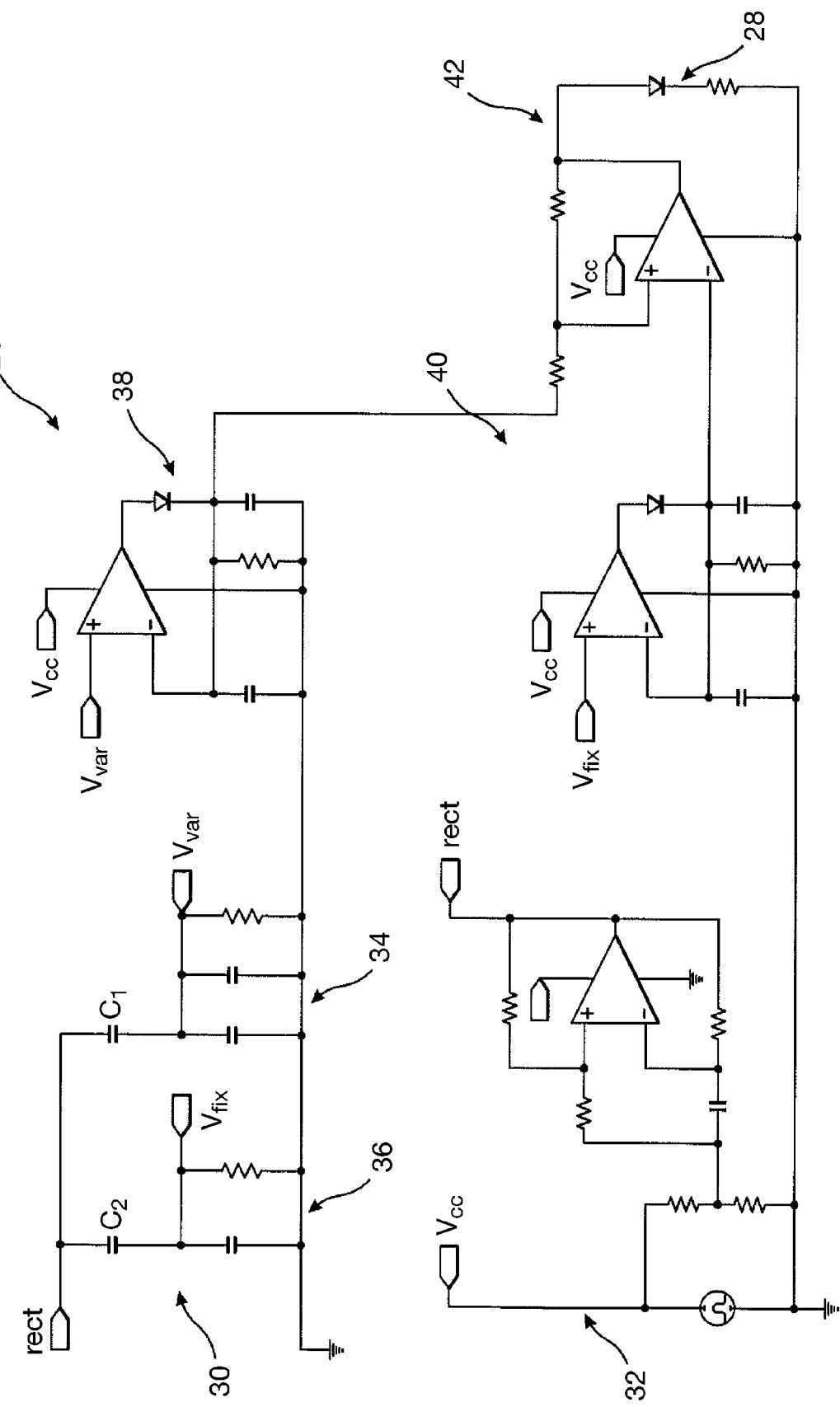
FIG. 6 is a schematic view of an embodiment of the electronic evaluating device of the safety belt warning system by way of example.

The electrically conductive coats 12 can be connected by strip conductors 22 to terminals 24 by which the two capacitors $C_1$, $C_2$ formed can be connected to an electronic evaluating device 26 (cf. FIG. 6).

Figure 2:
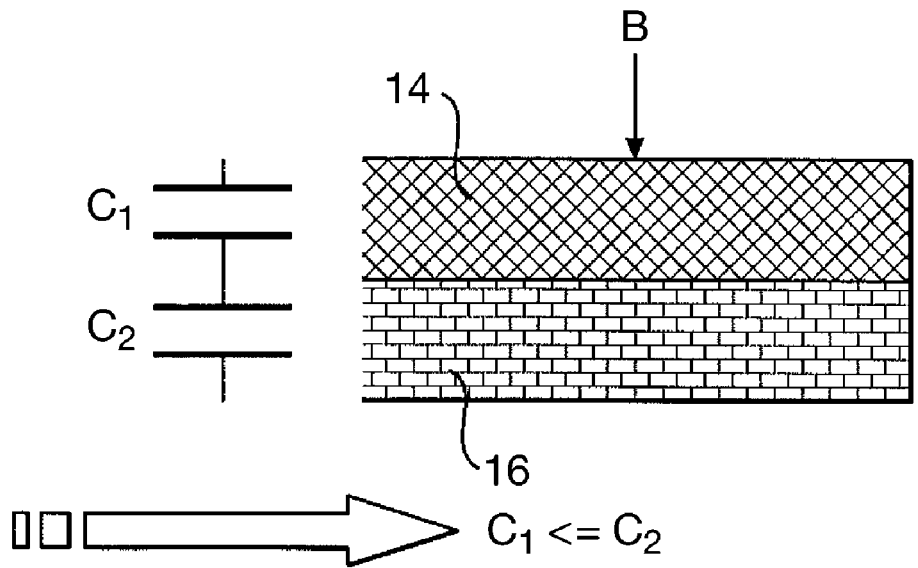
FIG. 2 is a schematic view of the two dielectric layers of the sensor mat as in FIG. 1 when there is no load.

FIG. 2 shows in a schematic view the two dielectric layers 14, 16 of the sensor mat 10 as in FIG. 1 when there is no load or the seat is not occupied. As can be seen with the aid of FIG. 2, in this case the more compressible dielectric layer 14 can have for example at least substantially the same thickness as the layer 16 which has the relative lower compressibility or is incompressible.

In FIG. 2, on the left beside the two dielectric layers 14 are shown the capacitors $C_1$, $C_2$ comprising these layers 14, 16 as well as the electrically conductive coats 12 concerned. In the present case with no load, the capacitance of the capacitor $C_1$ comprising the more compressible dielectric layer 14 can be for example lower than or equal to the capacitance of the capacitor $C_2$ comprising the less compressible or incompressible layer 16.

By contrast, FIG. 3 shows in a schematic view the two dielectric layers 14, 16 of the sensor mat 10 under load. The dielectric layer 14 having the relatively higher compressibility is therefore compressed in the direction of loading B. This layer 14 can accordingly, as shown, have a lower thickness under load than dielectric layer 16. Correspondingly, the capacitance of the capacitor $C_1$ comprising the layer 14 is greater.

In the present case of a load, therefore, the capacitance of the capacitor $C_1$ comprising the more compressible layer 14 is substantially greater than the capacitance of the capacitor $C_2$ comprising the less compressible or incompressible layer 16.

FIG. 4 shows in a schematic view the sensor mat 10 as in FIG. 1 in the unfolded state, the two dielectric layers being omitted for clarity's sake.

As can be seen with the aid of FIG. 4, the electrically conductive coats 12 can be formed by a respective electrically conductive coating, in particular copper coating, of the flexible film 18. Again the strip conductors 22 by which the three electrically conductive coats 12 are connected to the three terminals 24 can be seen too.

FIG. 5 shows a comparison of materials for the two dielectric layers 14, 16 of the sensor mat 10 by way of examples. Here, the material for the dielectric layer 14 having higher compressibility is shown on the left of FIG. 5, and the material for the layer 16 which has a relatively lower compressibility or is incompressible is shown on the right. As already mentioned, the dielectric layer 14 having the relatively higher compressibility can be made of silicone rubber. At least the dielectric layer 16 which has the relatively lower compressibility or is incompressible can in particular have a three-dimensional knitted spacer fabric. As can be seen with the aid of the top centre section of FIG. 5, in particular both layers 14, 16 can be air-permeable.

FIG. 6 shows in a schematic view an embodiment of an electronic evaluating device 26 of the safety belt system by way of example. Here, this evaluating device 26 can in particular be designed in such a way that, if occasion arises, a belt warning signal 28 is generated as a function of the capacitances of the two capacitors $C_1$, $C_2$, which here takes place through an LED output, for example. In this case the evaluating device 26 is in particular designed in such a way that the belt warning signal 28 can be generated as a function of a variation in the capacitances of the two capacitors $C_1$, $C_2$ relative to each other.

As can be seen with the aid of FIG. 6, the evaluating device 26 comprises a bridge circuit 30 which can be in particular a so-called double bridge circuit. In this case the two capacitors $C_1$, $C_2$ are associated with different branches of this bridge circuit 30.

The evaluating device 26 also comprises a signal generator 32, which in the present case is for example a square wave generator.

The signal generator 32 delivers a "rect" output signal which is applied to the bridge circuit 30.

The bridge circuit 30 comprises a variable bridge portion 34 which delivers a variable output signal $V_{var}$ and a fixed bridge portion 36 which delivers a fixed output signal $V_{fix}$.

The output signal $V_{var}$ of the variable bridge portion 34 is delivered e.g. to a first peak-value rectifier 38 and the output signal $V_{fix}$ of the fixed bridge portion 36 is delivered e.g. to a second peak-value rectifier 40.

The output signals of the two rectifiers 38, 40, here for example peak-value rectifiers, are delivered to a comparator 42 which can be for example a comparator with hysteresis. This comparator 42 then if occasion arises delivers the belt warning signal 28.

Figure 7:
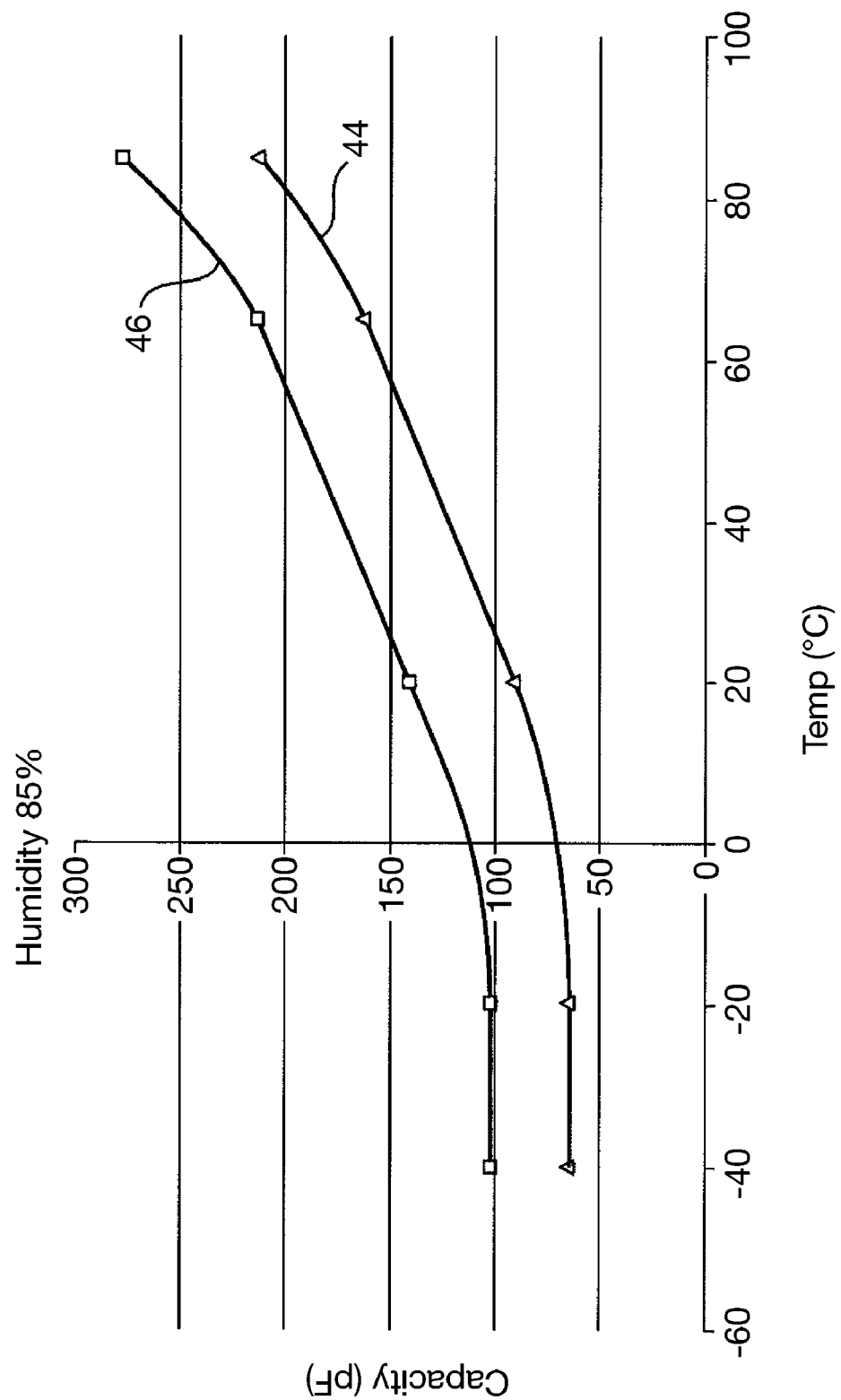
FIG. 7 is a graph showing the effect of temperature on capacitance in the loaded and unloaded states of the sensor mat.

FIG. 7 shows a graph from which can be seen the effect of temperature on capacitance in the loaded and unloaded states of the sensor mat 10. Here, on the abscissa is plotted the temperature in C and on the ordinate is plotted the capacitance in pF.

Here, curve 44 shows the progression of capacitance in the unloaded state. This is therefore a reference curve. By contrast, the progression of capacitance in the loaded state is indicated with curve 46.

The measurements were performed at a humidity of 85%.

The invention claimed is:

1. A seat belt warning system comprising
   a sensor mat having a surface and adapted for detecting a force acting upon the surface in a direction, said sensor mat comprising
   a first conductive layer, a second conductive layer and a third conductive layer disposed in parallel, spaced relationship;
   a first dielectric layer interposed between the first conductive layer and the second conductive layer and having a first compressibility in response to the force, said first conductive layer, said first dielectric layer and said second conductive layer forming a first electrical capacitor acted upon by the force and characterized by a first capacitance that varies dependent upon the force; and
   a second dielectric layer interposed between the second conductive layer and the third conductive layer and having a second compressibility in response to the force, said second compressibility being different from the first compressibility, said second conductive layer, said second dielectric layer and said third conductive layer forming a second electrical capacitor acted upon by the force and characterized by a second capacitance that varies dependent upon the force different from the first capacitance.

2. The seat belt warning system according to claim 1, characterised in that the second dielectric layer is substantially incompressible.

3. The seat belt warning system according to claim 1, characterised in that the first capacitance and the second capacitance are substantially equal when no force is applied to the sensor mat.

4. The seat belt warning system according to claim 1, further comprising an evaluating device adapted to provide a belt warning signal based upon the first capacitance and the second capacitance.

5. The seat belt warning system according to claim 4, wherein the evaluating device is configured to provide the belt warning signal based upon a variation in a capacitance of the first capacitor relative to a variation in a capacitance of the second capacitor.

6. The seat belt warning system according to claim 4, wherein the evaluating device comprises a bridge circuit having a first branch and a second branch, said first capacitor being associated the first branch and the second capacitor being associated with the second branch.

7. The seat belt warning system according to claim 6, wherein the bridge circuit is balanced when no load is applied to the sensor mat.

8. The seat belt warning system according to claim 1, wherein the first dielectric layer has a high compressibility relative to the second dielectric layer and is arranged above the second dielectric layer.

9. The seat belt warning system according to claim 1, wherein the sensor mat comprises a flexible film, said first conductive layer being formed by a metal coating applied to a first portion of the flexible film, said second conductive layer being formed by a metal coating applied to a second portion of the flexible film, said third conductive layer being formed by a metal coating applied to a third portion of the flexible film, said flexible film being folded to form a first intermediate space adapted to receive the first dielectric layer and a second intermediate space adapted to receive the second dielectric layer.

10. The seat belt warning system according to claim 9, wherein the flexible film is formed of a PET or PEN composition.

11. The seat belt warning system according to claim 9, wherein the metal coatings are composed of copper.

12. The seat belt warning system according to claim 1, wherein at least one of the first dielectric layer and the second dielectric layer is air-permeable.

13. The seat belt warning system according to claim 1, wherein one of the first dielectric layer and the second dielectric layer has a higher compressibility and is composed of silicone rubber.

14. The seat belt warning system according to claim 1, wherein one of the first dielectric layer and the second dielectric layer has a lower compressibility and is formed of a three-dimensional mesh structure.

15. The seat belt warning system according to claim 1, wherein the first dielectric layer has a first layer temperature expansion coefficient or a first layer moisture expansion coefficient, and the second dielectric layer has a second layer temperature expansion coefficient substantially equal to the first layer temperature expansion coefficient or a second layer moisture expansion coefficient substantially equal to the first layer moisture expansion coefficient.

* * * * *